United States Patent
Van Herpen

(10) Patent No.: US 10,076,017 B2
(45) Date of Patent: Sep. 11, 2018

(54) METHOD FOR CREATING AMBIENCE LIGHTING EFFECT BASED ON DATA DERIVED FROM STAGE PERFORMANCE

(71) Applicant: PHILIPS LIGHTING HOLDING B.V., Eindhoven (NL)

(72) Inventor: Maarten Marinus Johannes Wilhelm Van Herpen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/646,417

(22) PCT Filed: Nov. 14, 2013

(86) PCT No.: PCT/IB2013/060136
§ 371 (c)(1),
(2) Date: May 21, 2015

(87) PCT Pub. No.: WO2014/083470
PCT Pub. Date: Jun. 5, 2014

(65) Prior Publication Data
US 2015/0305117 A1 Oct. 22, 2015

Related U.S. Application Data

(60) Provisional application No. 61/730,102, filed on Nov. 27, 2012.

(51) Int. Cl.
*H04N 9/47* (2006.01)
*H04N 5/222* (2006.01)
(Continued)

(52) U.S. Cl.
CPC ........... *H05B 37/029* (2013.01); *H04N 7/183* (2013.01); *H05B 37/0227* (2013.01);
(Continued)

(58) Field of Classification Search
CPC ... H05B 37/029; H05B 37/0227; H04B 7/183
See application file for complete search history.

(56) References Cited

U.S. PATENT DOCUMENTS

| 4,158,132 A | 6/1979 | O'Dell | |
|---|---|---|---|
| 2002/0091004 A1* | 7/2002 | Rackham | A63J 1/00 472/60 |
| 2002/0135739 A1* | 9/2002 | Standard | E04H 3/22 353/46 |

(Continued)

FOREIGN PATENT DOCUMENTS

| CN | 101370336 A | 2/2009 |
|---|---|---|
| CN | 101427578 A | 5/2009 |

(Continued)

OTHER PUBLICATIONS

High End Systems, Wholehog 2 Fixture Libraries, Sep. 8, 2007, p. 1, https://web.archive.Org/web/20070908042007/http://www.flyingpig.com/support/hog2/downloads/Wholehog2Libraries.shtml, accessed on May 7, 2016.*

*Primary Examiner* — Dedei K Hammond
*Assistant Examiner* — Raymond R Chai

(57) ABSTRACT

The invention provides a method for creating in a display space an ambience lighting effect, wherein the display space comprises a screen configured to display moving images and a display space light source configured to provide the ambience lighting effect, wherein the moving images are representative of a stage performance in a performance space, the method comprising (a) deriving ambience lighting effect input data from one or more of (i) a light related cue provided by a cue manager, (ii) lighting effects accompanying the stage performance, and (iii) an analysis of a video shot by a video camera configured to monitor at least a part of an audience present in the performance space; and (b) displaying the moving images on the screen in the display space, while creating with the display space light source said ambience lighting effect at least based on the ambience lighting effect input data.

14 Claims, 3 Drawing Sheets

(51) Int. Cl.
*H05B 37/02* (2006.01)
*H04N 7/18* (2006.01)
H04N 21/2187 (2011.01)
H04N 21/431 (2011.01)
H04N 21/84 (2011.01)

(52) U.S. Cl.
CPC ..... *H04N 21/2187* (2013.01); *H04N 21/4312* (2013.01); *H04N 21/4318* (2013.01); *H04N 21/84* (2013.01)

(56) References Cited

U.S. PATENT DOCUMENTS

| | | | |
|---|---|---|---|
| 2002/0154773 | A1 | 10/2002 | Standard |
| 2004/0032536 | A1* | 2/2004 | Islam ................. H04N 7/183 348/722 |
| 2004/0264917 | A1 | 12/2004 | Braun |
| 2006/0062424 | A1 | 3/2006 | Diederiks |
| 2010/0177247 | A1* | 7/2010 | Sekulovski ............ H05B 37/02 348/602 |
| 2011/0063442 | A1* | 3/2011 | Aarts .................... A47F 11/06 348/143 |
| 2011/0295392 | A1* | 12/2011 | Cunnington ........... G06Q 10/10 700/90 |

FOREIGN PATENT DOCUMENTS

| | | | |
|---|---|---|---|
| CN | 102656950 | A | 9/2012 |
| WO | 2006003600 | A1 | 1/2006 |
| WO | 2006003624 | A1 | 1/2006 |
| WO | 2011073877 | A1 | 6/2011 |

\* cited by examiner

METHOD FOR CREATING AMBIENCE LIGHTING EFFECT BASED ON DATA DERIVED FROM STAGE PERFORMANCE

CROSS-REFERENCE TO PRIOR APPLICATIONS

This application is the U.S. National Phase application under 35 U.S.C. § 371 of International Application No. PCT/IB2013/060136, filed on Nov. 14, 2013, which claims the benefit of U.S. Provisional Patent Application No. 61/730,102, filed on Nov. 27, 2012. These applications are hereby incorporated by reference herein.

FIELD OF THE INVENTION

The invention relates to a method for creating in a display space an ambience lighting effect in support of moving images. The invention further relates to a theater system that may be used for such method. The invention also relates to a light source that can be used in a performance stage wherein the moving images are generated or have been generated.

BACKGROUND OF THE INVENTION

The creation of ambience light, also in for instance cinemas, is known in the art. WO-2011/073877, for instance, describes a method for providing an ambience lighting effect in a cinema comprising a cinema display screen arranged on a front wall of the cinema and a plurality of light sources, comprising receiving first and second image content to be sequentially displayed on the cinema display screen, determining at least one of a color and intensity for the second image content, determining a second set of control data for controlling the plurality of light sources to emit an ambient lighting effect based on at least one of the color and intensity for the second image content, and associating the second set of control data with the first set of image content. Advantages of the method of WO-2011/073877 include the possibility to provide an improved ambient lighting experience by using the "extra space" specifically available in a cinema, e.g. walls, floor and ceiling.

SUMMARY OF THE INVENTION

Ambilight, which is short for Ambient Lighting Technology, is a feature invented by Philips, generating lighting effects around the TV that correspond to the video content. Ambilight may have the advantages of a larger virtual screen, a more immersive viewing experience, and it may reduce viewer eye strain.

The concepts as well as various methods of calculating the color from the video signal are described in for instance US-2006/062424, WO-2006/003600 and WO-2006/003624, which are herein incorporated by reference.

It has been observed by the inventors that there seems to be a trend towards "alternative content" for cinemas. For example, alternative content could be a concert, a musical, an opera, etc. Often, the alternative content may be live events.

At the performance space (i.e. where the original alternative content is created), such as a stadium or an opera house, the audience may well be immersed by the total sensorial experiences of the stage performance, (and the concomitant) audio, lighting effects and audience behavior. However, in a display space, such as a cinema, the experience may be different and less immersive, while there may be a desire to experience the same as during the stage performance in the performance space.

Hence, a problem is how to determine the best lighting effects to play with movie content (in the display space). In particular, the problem is what kind of lighting effects to combine with alternative content for cinemas, or other types of display spaces, of especially stage productions such as a concert, a musical, an opera, etc.

A solution might be to analyze the movie content to determine the lighting effects, but this has several problems. For example, the movie content does not always show the entire stage, so a relevant lighting effect (at the performance space) might occur outside the field of view, which means it is detected only when the camera switches back to stage view, resulting in the wrong timing for the lighting effect (in the display space). Another problem may be that for live events it is not possible to analyze content that will be displayed in the future. Thus, it becomes even more difficult to have the right timing for e.g. lighting effects.

Hence, it is an aspect of the invention to provide an alternative method for creating in a display space an ambience lighting effect in support of moving images, which preferably further provides a good or better match between the (visual) experience of the audience in the performance space during the stage performance and the (visual) experience of the audience in the display space during the display of the stage performance in the display space.

A solution proposed here is to determine the ambience lighting effects based on (amongst others) especially cue data that (are) were recorded during the stage production. Hence, not the stage performance itself, or the display (of part) thereof in a display space, such as the video content on a screen in the display space (though the additional use thereof is not excluded by this invention, see also below), is the basis of the ambience lighting effects, but especially cue data given by a cue manager which is present during the live stage performance production (and gives cues during the live stage performance production). During a stage production (herein also indicated as stage performance) the cue manager normally calls "cues" during the show, to control for example lighting and/or sound. This is needed to make sure everything on stage happens at the right timing. No rehearsed action will take place, unless the cue manager calls the "go" cue. The cue manager either calls the "go" cue with a spoken word, or with e.g. an indicator light (or (another) electric signal). Especially, the cue manager (or cue operator) gives cues during the stage performance. This can for example be a cue manager, who in general also gives other types of cues (sometimes also indicated as "stage manager"), but the cue manager can also be a light board operator that knows the stage performance and presses cues himself during the stage performance (in that case we need to track when he presses these buttons). The term "light related cue" indicates that the cue is intended to control light. This may in an embodiment be light of any light source in the performance space. Herein the term cue or light related cue may also relate to a plurality of (light related) cues. Herein, the term "cue manager" relates to any person that gives cues (during the stage performance) that are related to lighting ("light related cue"); though as indicated above, the cue manager may also give other cues. The cue manager or cue operator is a human. Hence, ambience lighting effect input data derived from the light related cue provided by a cue manager present at the performance space may be derived from a cue instruction (here light related cue) by the cue manager or by a person (or device) acting in reaction to the cue instruction (here light related cue). Especially, the light related cue triggers a lighting effect in the performance space.

Therefore, in this invention alternative data (i.e. instead of or in addition to the movie content) are used as basis for the ambience lighting effects in the display space. In addition to the cue data generated by the cue manager, or alternative thereto, also other alternative data may be used as basis for the ambience lighting effects in the display space, such a lighting effects accompanying the stage performance, or the analysis of video content of the audience (of a camera configured to monitor at least a part of an audience present in the performance space) in the performance space during the stage performance.

Hence, in a first aspect the invention provides a method for creating in a display space an ambience lighting effect in support of moving images, wherein the display space comprises a screen configured to display the moving images and a display space light source configured to provide the ambience lighting effect, wherein the moving images are representative of a stage performance performed in a performance space, the method comprising (a) deriving ambience lighting effect input data from one or more of (i) a (especially light related) cue provided by a cue manager (i.e. a "cue manager cue") present at the performance space at the time of the stage performance, (ii) lighting effects accompanying the stage performance in the performance space at the time of the stage performance, and (iii) an analysis of a video shot by a video camera configured to monitor at least a part of an audience (video footage) present in the performance space at the time of the stage performance; and (b) displaying the moving images on the screen in the display space, while creating in the display space with the display space light source said ambience lighting effect at least based on the ambience lighting effect input data.

Advantageously, in this way a good or better match between the (visual) experience of the audience in the performance space during the stage performance and the (visual) experience of the audience in the display space during the display of the stage performance in the display space. The experience of the audience in the display space may be more realistic and/or holistic (than when a performance would be displayed without the method of the invention). Further, zooming in of the movie (when displayed in the display space) does not necessarily alter the ambience light but the ambience light may still reflect the sphere (as it is or was) in the performance space (at the time of the stage performance), as the ambience light is not, or not entirely, based on the content on the screen in the display space.

Note that the act(s) of stage performance and displaying the moving images (movie or film) of the stage performance is not necessarily at the same time. Of course, there may be a (small) time difference due to transfer of the signal, but there may in an embodiment also be an intentional delay, such as a delay in the range of 0.25 minutes to 30 minutes (between the stage performance in the performance space and the display thereof in the display space).

Further, the method of the invention may also include embodiments wherein at any time later than the stage performance, the moving images of this stage performance are somewhere displayed, accompanied with the ambience lighting effects in the display stage. Hence, though in general the performance space and the display space are different, in principle they may also be the same. However, in such embodiments the stage performance and time of displaying the stage performance are separated in time, such as especially at different days.

Herein, the concept of Ambient light or Ambilight is further indicated as ambience light or ambience lighting. Note that ambience light may be based on the content of a video image displayed on the screen, but may also be based on the video content of a plurality of video images, of which one or more may be preceding a current video image and/or one or more may be subsequent to a current video image. Especially the color, and optionally also the intensity, of the ambience light is related to a dominant color of at least part of the image (or plurality of images).

As e.g. indicated in e.g. WO-2006/003624 and WO-2006/003600, a method may be applied for dominant color extraction from video content (i.e. one (or more consecutive) image(s)) encoded in a rendered color space to produce, using perceptual rules, a dominant color for emulation by the ambient light source. This ambient light source in the present context comprises at least the projector (though additional ambience light sources may also be applied).

Especially, this may include a method for dominant color extraction from video content encoded in a rendered color space (e.g. YUV, YCrCb, RGB) to produce, using perceptual rules, a dominant color for emulation by an ambient light source, comprising: (1) performing dominant color extraction from pixel chromaticities from said video content in said rendered color space to produce a dominant color by extracting any of: (a) a mode of said pixel chromaticities; (b) a median of said pixel chromaticities; (c) a weighted average by chromaticity of said pixel chromaticities; (d) a weighted average of said pixel chromaticities using a pixel weighting function that is a function of any of pixel position (i, j), chromaticity (x, y, R), and luminance; (2) further deriving the chromaticity of said dominant color in accordance with a perceptual rule, said perceptual rule chosen from any of: (a) a simple chromaticity transform; (b) a weighted average using said pixel weighting function so further formulated as to exhibit an influence from scene content that is obtained by assessing any of chromaticity and luminance for a plurality of pixels in said video content; (c) an extended dominant color extraction using a weighted average where said pixel weighting function is formulated as a function of scene content that is obtained by assessing any of chromaticity and luminance for a plurality of pixels in said video content, with said pixel weighting function further formulated such that weighting is at least reduced for majority pixels; and (3) transforming said dominant color from said rendered color space to a second rendered color space (R'G'B') so formed as to allow driving said ambient light source.

In yet another embodiment, this may involve a method for dominant color extraction from video content encoded in a rendered color space (RGB) to produce, using perceptual rules in accordance with a user preference, a dominant color for emulation by an ambient light source, comprising: (1) performing dominant color extraction from pixel chromaticities from said video content in said rendered color space to produce a dominant color by extracting any of: (a) a mode of said pixel chromaticities; (b) a median of said pixel chromaticities; (c) a weighted average by chromaticity of said pixel chromaticities; (d) a weighted average of said pixel chromaticities using a pixel weighting function that is a function of any of pixel position ((iota), j), chromaticity (x, y, R), and luminance; (2) further deriving at least one of the luminance, the chromaticity, a temporal delivery, and a spatial extraction of said dominant color in accordance with respective perceptual rules to produce a preferred ambient broadcast, and where said respective perceptual rules are varied in character an d effect by at least one of a plurality of possible explicit indicated user preferences; and where said respective perceptual rules comprise at least one of: (I) a luminance perceptual rule chosen from any of: (a) a luminance increase; (b) a luminance decrease; (c) a luminance floor; and (4) a luminance ceiling; (5) a suppressive luminance threshold; (6) a luminance transform; (II) a chromaticity perceptual rule chosen from at least one of: (a) a simple chromaticity transform; (b) a weighted average using said pixel weighting function so further formulated as to exhibit an influence from scene content that is obtained by assessing any of chromaticity and luminance for a plurality of pixels in said video content; (c) an extended dominant col or extraction using a weighted average where said pixel weighting function is formulated as a function of scene content that is obtained by assessing any of chromaticity and luminance for a plurality of pixels in said video content, with said pixel weighting function further formulated such that weighting is at least reduced for majority pixels; (III) a temporal delivery perceptual rule chosen from at least one of: (a) a decrease in the rate of change in at least one of luminance and chromaticity of said dominant color; (b) an increase in the rate of change in at least one of luminance and chromaticity of said dominant color; (IV) a spatial extraction perceptual rule chosen from at least one of: (a) giving greater weight in said pixel weighting function to scene content containing newly appearing features; (b) giving lesser weight in said pixel weighting function to scene content containing newly appearing features; (c) giving greater weight in said pixel weighting function to scene content from a selected extraction region; and (d) giving lesser weight in said pixel weighting function to scene content from a selected extraction region; and (3) Transforming the luminance and chromaticity of said preferred ambient broadcast from said rendered color space to a second rendered color space (R'G'B') so formed as to allow driving said ambient light source.

The term "rendered color space" may especially denote an image or color space captured from a sensor, or specific to a source or display device, which is device and image specific. Most RGB color spaces are rendered image spaces, including the video spaces used to drive video display. Herein, both the color spaces specific to the video display and the ambient light source may be rendered color spaces. Most LED light sources will use RGB color space, because a LED luminaire typically comprises a red, green and blue LED. The term "scene brightness" especially refers to any measure of luminance in scene content according to any desire criterion. The term "scene content" or "image content" may especially refer to that characteristic of video information capable of forming a viewable image that can be used to influence a desired choice of dominant color. Examples include white clouds, or darkness throughout much of a video image, which might cause certain pixels making such an image to be deemed majority pixels, or might result in non-isotropic treatment of pixels in a pixel weighting function; or might cause an image feature to be detected and subject to special or extended dominant color extraction. The term "simple chromaticity transform" may especially refer to a change or derivation of a dominant color or chromaticity according to a perceptual rule, not chosen or derived as a function of scene content, and where the change or derivation results in a chromaticity which is different from that which might otherwise be chosen. An example: a transform of a first dominant color (x, y) chosen via dominant color extraction (e.g., purple) to a second color (x', y') in order to satisfy a perceptual rule. Further, the phrase "transforming color information to an unrendered color space" herein may especially comprise either direct transformation to the unrendered color space, or use or benefit derived from using inversion of a tristimulus primary matrix obtained by transforming to the unrendered color space, or any calculational equivalent. The term "unrendered color space" may especially denote a standard or non-device-specific color space, such as those describing original image colorimetry using standard CIE XYZ; ISO RGB, such as defined in ISO 17321 standards; Photo YCC; and the CIE LAB color space.

Ambience light may differ in intensity and/or color for instance as function from the distance to the screen. By way of example, when dividing a (projected) video image in four parts, the dominant color from each part may be extracted and be used as color for ambience light that is provided adjacent to the (projected) video image and adjacent to the respective (projected) video image part. The term "adjacent" may be understood in one embodiment as practically no distance between the (projected) video image part and the ambience light adjacent to the (projected) video image part. However, the ambience light may also be provided more remote from the (projected) video image, such as for instance may be the case in WO-2011/073877.

The display space and performance space may in principle be any space. It can be an open space, like an open air cinema, but even a village square. It can also be a more bordered space, like an arena, a stadium, or a roofed space, like a cinema (or also a stadium). The performance space and display space are not necessarily of the same type, though they may be. Hence, they may be independently chosen from each other. Therefore, the performance space and the display space are each individually selected from the (non-limiting) group comprising a cinema, a music hall, a theater, an opera house, a stadium, an arena, a conference room, a home, a hospitality area (such as a restaurant, like a restaurant lobby, a pub, etc.) a church, an exhibition ground, and an open square. Hence, the term "display space" may relate to any space, wherein the stage performance can be displayed on a screen. The term "display space" may also relate to a plurality of display spaces. Especially, the display space is thus not the performance space at the time of the stage performance.

In an embodiment, the screen comprises one or more of a display screen and a projection screen. The display screen may especially be a TV, like a LED TV or a plasma TV; the projection screen (in general a remote screen) may especially be a (white) area, on which a movie can be projected (with a projector (remote from the screen)), such as a cinema screen. The screen can be a rigid wall-mounted screen, a pull-down screen, an electric screen (with an electric motor to position the screen to a use and non-use position), a switchable projection screen (can be opaque and clear), or (even) a mobile screen. The term "screen" may also relate to a plurality of screens. Hence, the term screen may also relate to an aggregate screen, i.e. an arrangement of screens that are used as one screen to project the image(s) on with the projector. The term "projector" may also relate to a plurality of projectors.

Also the stage performance can in fact be any act or activity to which an audience may watch (and listen). The term "stage" in the term "stage performance" does therefore not necessarily refer to the interpretation of a theater stage (sometimes referred to as the deck in stagecraft) which is a designated space for the performance of productions (in a theater). As indicated above, the stage may be any space wherein, or place in a space wherein or whereon, an act or stage performance can be performed. In an embodiment, the stage performance is selected from the (non-limiting) group comprising a music concert, a musical, a sport event, a presentation (like a business presentation), a seminar, an opera, a religious activity (like a sermon or a mass), a cultural activity, a social activity, a commercial activity, and a political activity (like a speech by a politician).

The stage performance may be recorded (see also below), for instance for a later display (streaming) or for direct (live streaming) or (shortly, like less than 30 minutes) delayed display ((live) streaming) in the display space. Hence, during the stage performance, the performance space may further comprise one or more cameras (and sound recording apparatus) configured and/or used to record the stage performance. In this way, the moving images or movie is generated, for (later) display in the display space. This recorded stage performance is the basis or forms the basis of the movie, i.e. the moving images, that is (are) displayed in the display space. Therefore, the moving images are representative of a stage performance (being) performed in a performance space.

Hence, in a specific embodiment the method includes live streaming the stage performance to the display space while generating with the display space light source ambience lighting effects based on the ambience lighting effect input data. Especially in such instances, the method of the invention is advantageous, as "live" at the display stage, it is not known in advance what kind of lighting effects and/or other relevant data is generated at the performance space. Hence, this cannot be anticipated, and ambience lighting may not very well be controlled (with prior art solutions).

During the stage performance, a cue manger (including in an embodiment a plurality of cue managers) may be present at the performance space. A cue manager may be responsible for a large number of activities, such as organizing rehearsals; working with others to plan wardrobe, set design, scene changes, sound and lighting; giving cues for the performers to go on stage; cueing the technical crew for sound and lighting effects. Especially the cue aspect is relevant for this invention, as these may trigger aspects other than the pure performance of one or more persons ("stage performance"). An example of a cue may for instance be spoken words like "light xyz" or "lighting scheme abc" followed by "go", or followed by an (electric) signal (like switching on a switch) on a control panel, which leads to switching on a light source or generation of a lighting scheme. Hence, the cue manager triggers the lighting effects within the performance space. From these cue data, lighting information and its timing information (i.e. information on the timing of the lighting) may be derived. Hence, from these data ambience lighting input data can be derived. Hence, in an embodiment, the ambience lighting effect input data are derived from one or more of a spoken word and an electrical signal given or induced by the live cue manager. The term "cue manager" especially relates to a person who is in control of the (live) lighting effects during a live stage performance. The term "cue manager" may also relate to a plurality of cue managers. The term "cue" may also relate to a plurality of cues In one embodiment ambience light effects are generated by a person that is present at the performance space. For example, this person is a "display space ambience light manager" (present at the performance space), who listens to the instructions of the cue manager (or stage manager), and translates these instructions into ambience light effects to be displayed in the display space, for example by pressing a button that sends a data signal to the display space to start a certain light effect in the display space. For example, this person could also be a cue manager (or stage manager) himself/herself, in the sense that he/she knows the show and the timing of the cues and presses them himself (or may generate in an alternative way the ambience lighting effect input data). In such embodiment, there could be two cue managers at the performance space, one for the performance space, and one for the display space. The cue manager for the performance space may for instance be a stage manager (see also above).

Note that the ambience lighting effect input may thus especially be derived from (a cue given by) a person, the cue manager, who is present at the live stage performance. This may nevertheless include that many of the cues may trigger (light) effects earlier recorded and/or stored in databases, but it is the cue manager who triggers these at the appropriate time during the live stage performance. Hence, part of the ambience lighting effect input data may also be derived from a library containing lighting effect information and (its) timing information, wherein the lighting effect information in the library contains one or more series of lighting effects. The timing information indicated here may especially relate to the internal timing of a series of lighting effects (wherein the series (and not the individual lighting effect within the series) is triggered by the cue).

The cue manager may thus control the lighting in the performance space. This lighting may not only be the lighting of the stage, the lighting may also include light sources around the stage, or remote from the stage, such as light sources that are configured to (temporarily) illuminate an audience in the performance space.

Hence, instead of using the (light related) stage manger cue of the cue manager as (basis for) the ambience lighting effect input data, one may also use the lighting effects itself as basis for) the ambience lighting effect input data. Hence, in an embodiment the method includes deriving ambience lighting effect input data (i.e. especially lighting effect information and its timing information) from lighting effects accompanying the stage performance in the performance space at the time of the stage performance. However, this information is thus not (primarily) extracted from the movie content (as in present TV Ambilight), but is derived from the performance space light source(s), and/or the cue (see above and below), or a video camera targeted at the audience in the performance space (see below).

Therefore, in a specific embodiment, the performance space comprises a performance space light source, wherein the stage performance in the performance space is accompanied by lighting effects provided by the performance space light source. Especially, as indicated above, the lighting effects provided by the performance space light source may be triggered during the stage performance by the light related cue. The term "performance space light source" may also relate to a plurality of "performance space light source". This term may especially relate to a performance space lighting system comprising a plurality of light sources (that may be arranged at a plurality of locations in the performance space).

In a specific embodiment, the performance space light source further comprises a signal generator, configured to translate instructions received into a light source signal containing the ambience lighting effect input data, and a controller, functionally coupled to the display space light source, is configured to control the ambience light of the display space light source as function of said light source signal. This is further also elucidated below. In the art, one often cannot just add a signal interceptor between the light source and the controller, because the data signal contains addressing information to address particular lights. By implementing the solution in the current proposal, the performance space light source first identifies whether it is being addressed and how, before the performance space light source transmits this data towards the display area (either directly or indirectly).

In addition to are alternative to the above indicated options, the ambience lighting effect input data may also be derived from an analysis of a video shot by a video camera configured to monitor at least a part of an audience present in the performance space at the time of the stage performance. Hence, to this end the performance stage may further comprises a video camera configured to monitor at least part of an audience in the performance space, and wherein at least part of the ambience lighting effect input data are derived from a video analysis of a video shot by the video camera. The advantage of this approach is that it becomes easier to reproduce (in the display space) the lighting experience of the audience at the stage performance. This video camera may be used to obtain lighting information and its timing information, as the lighting effects may also reach the audience or may especially be targeted at the audience. However, in addition or alternative thereto, the video camera may also derive other information from the audience. For instance, a mood of excitement under at least part of the audience, or a "wave" by at least part of the audience, may also be used as ambience lighting effect input data. The term "video camera" may also relate to a plurality of video cameras.

Hence, the method includes deriving ambience lighting effect input data from one or more of (i) a (especially light related) cue provided by a cue manager present at the performance space at the time of the stage performance, (ii) lighting effects accompanying the stage performance in the performance space at the time of the stage performance, and (iii) an analysis of a video shot by a video camera configured to monitor at least a part of an audience present in the performance space at the time of the stage performance. The term "video shot" may also relate to a plurality of video shots. Preferably the video shots are stationary video shots (the camera does not move or zoom).

Note that in addition to or alternative to the video camera, also other sensors, especially targeted at the audience, may be used to obtain ambience lighting effect input data, such as an audio sensor (and/or a light sensor. A light sensor located within the audience can accurately detect how much light is shining at the audience and when).

The ambience lighting effect input data especially indicate the type and time of effects. For instance, as indicated above, it may include the lighting effect and its timing information. Additionally or alternatively, it may include information on behavior of the audience. Especially, it at least includes lighting and its timing information (i.e. the timing of the lighting, like light effects as function of the time). The lighting is especially generated by performance light source(s), which may especially be triggered by the cue manager. The ambience lighting effect input data may be translated to ambience lighting effect output data. This may at least partly be executed with a controller at the performance space and/or may at least partly be executed with a controller at the display space. Such translation may include defining the timing of a light of a specific color, the intensity of such light, a sequence of lighting effects, the (relative) location of a light source etcetera. A controller at the display space may control a display space light source at the display space, to support with ambience lighting effect(s) the moving images. Hence, the method also includes displaying the moving images on the screen in the display space, while creating in the display space with the display space light source said ambience lighting effect at least based on the ambience lighting effect input data. The term "display space light source" may also relate to a plurality of light sources. This term may especially relate to a display space lighting system comprising a plurality of light sources (that may be arranged at a plurality of locations in the display space).

For instance, when during the stage performance part of the performance space is illuminated with green light, this may be translated at the display space with also illuminating (part of) the display space with green light (during display of the moving images at the same moment as the moving images show the respective scene of the stage performance). Or, for instance when stroboscopic lighting effects are used during the stage performance, during display of the stage performance in the display space the light source (or one or more of the plurality of light sources) may be used as stroboscope and mimic or execute the same stroboscopic lighting effects at the appropriate time in the movie.

As indicated above, the ambience lighting effect(s) at the display space are at least based on the ambience lighting effect input data. However, also other data may be used to control the ambience lighting effect(s). In an embodiment, also color and optionally intensity of the color of the moving images, or part of an image, is used to determine the ambience light color and optionally its intensity. Hence, the method may also include displaying the stage performance in the display space while generating with the display space light source ambience lighting effects based on (i) the ambience lighting effect input data and (ii) the content of the information displayed on the screen in the display space.

The term "ambience lighting effect" includes in an embodiment that different colors of light at different locations within the display space may be applied. Alternatively or additionally, different flashing light sequences at different locations within the display space may be applied. If desired, substantially the entire performance space may be used to derive ambience lighting effect input data from, which may be translated to substantially the entire display space.

In an embodiment, the method further comprises recording on a data carrier a scene of the stage performance shown in the performance space or displayed on the screen in the display space, especially shown in the performance space. Such data carrier may be used for an immediate or delayed performance in the display space. Examples of data carriers, or data storage devices, are CDs, CD-ROMs, DVD-ROMs, USB devices, hard drives or any other physical product carrying data, files or software The method may further also comprise recording on a data carrier (the same or another data carrier as described above) the ambience lighting effect input data. Especially, the method may further also comprise recording on the data carrier the ambience lighting effect input data derived during a scene of the stage performance shown in the performance space (or optionally displayed on the screen in the display space). Hence, the ambience lighting effect input data derived as described above, may be stored on a data carrier, especially together with the relevant scene of the stage performance. Hence, the method may further comprise recording on a data carrier (i) a scene of the stage performance shown in the performance space or displayed on the screen in the display space, as well as (ii) the ambience lighting effect input data derived during said scene. Note that the term "scene" may also relate to a plurality of scenes.

The invention also pertains to such data carrier(s) as described herein.

The invention also relates to a theater system comprising a controller, wherein the controller is configured to control (i) a display device, configured to display information on a screen or a display, and (ii) a light source, configured to create an ambience lighting effect, wherein the controller is configured to control as function of a video signal containing information on a stage performance the information on the screen or display, and wherein the controller is further configured to control as function of a further signal the ambience lighting effect of the light source. In an embodiment, the theater system is a home theater system.

In a further aspect, the invention also provides a light source for use in a space wherein a stage performance can be performed, wherein the light source further comprises a memory functionally coupled to said light source, configured to store ambience lighting effect input data, when during a stage performance lighting effects are generated with the light source. Especially, such light source may further comprise a transmitter (or sender unit), configured to receive ambience lighting effect input data from the memory and configured to generate a light source signal containing the ambience lighting effect input data. Therefore, in an aspect the invention also provides a light source (performance space light source) for use in a space wherein a stage performance can be performed, wherein the light source further comprises a transmitter functionally coupled to said light source, configured to transmit (or send) ambience lighting effect input data, when during a stage performance lighting effects are generated with the light source. The ambience lighting effect input data from the light source may (directly) be used when displaying the moving images in the display space. In yet a further aspect, the invention provides a light source, such as for use in a space wherein a stage performance can be performed, wherein the light source further comprises a transmitter functionally coupled to said light source, configured to transmit a light source signal containing ambience lighting effect input data. Especially, the light source further comprises a memory functionally coupled to said light source, configured to store ambience lighting effect input data, when during a stage performance lighting effects are generated with the light source, wherein the transmitter is, configured to receive ambience lighting effect input data from the memory and configured to generate a light source signal containing the ambience lighting effect input data. The transmitter may send the light source signal to a receiver at the display space. The term "light source signal" especially refers to a (digital) signal generated by the light source. This term thus refers especially to a signal that can be wired via an electrical wire or wireless, to a receiver.

In an embodiment, one or more of the performance space light source and the display space light source comprise (optionally independently of each other) a plurality of light sources.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale

DETAILED DESCRIPTION OF THE EMBODIMENTS

Figure 1A:
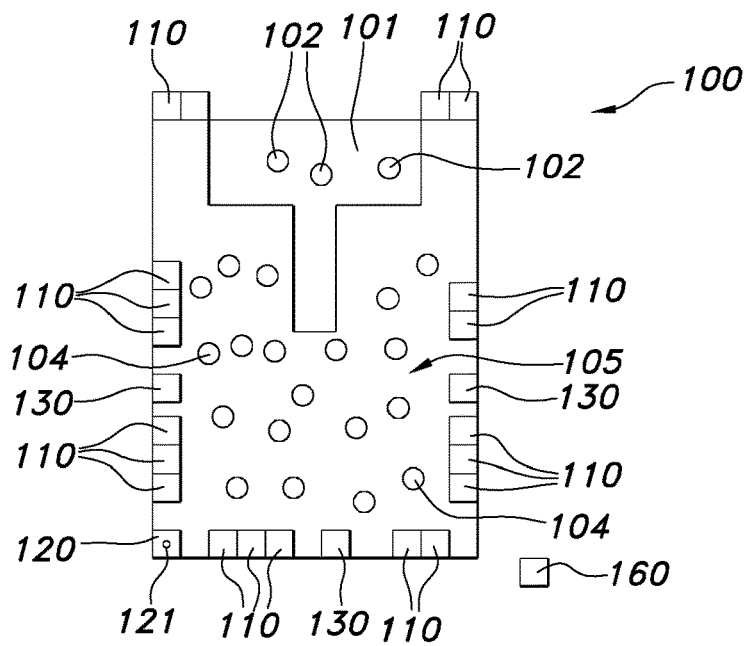
FIGS. 1a to 1b schematically depict some aspects of the invention.

FIG. 1a schematically depicts a performance space 100, with a stage 101, and with performers, such as actors, indicated with reference 102. Within the performance space 100, audience members 104 form an audience 105, that watch and/or listen to the stage performance of the performers 102. Optionally, the performance space further includes one or more performance space light source 110, which may especially be used to provide lighting effects at the performance space 100. Different lighting effects may be generated at different locations of the performance space 100.

The performance space 100 may include a cue manager site 120. A cue manager 121 is also shown. Further, optionally the performance space may include one or more video cameras 130, which may be configured to monitor at least part of the audience.

Optionally, a sender (unit) or transmitter 160 may be present, configured to send (transmit) one or more (i) images of the performance and (ii) ambience lighting effect input data to a display space (see also below).

Figure 1B:
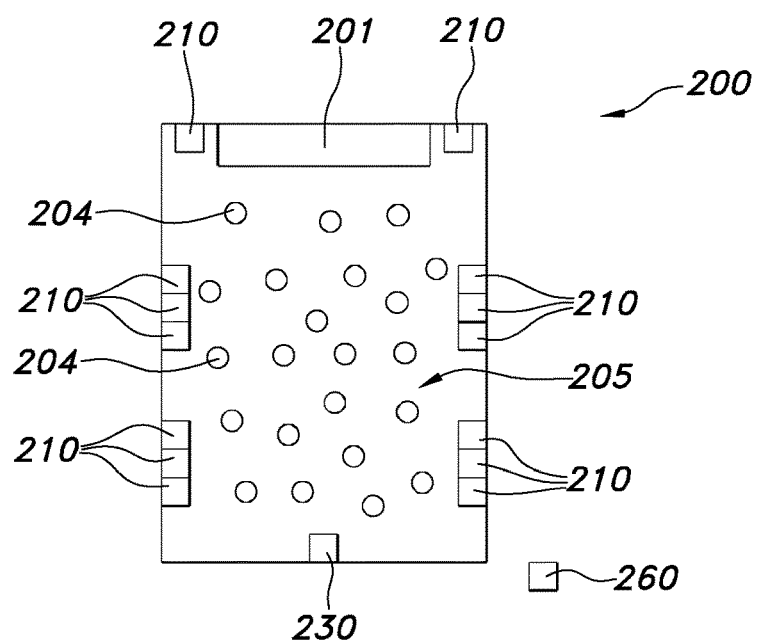

FIG. 1*b* schematically depicts a display space 200. Within the display space 200, audience members 204 form an audience 205, that watch and/or listen to the stage performance (of one or more performer(s)) being displayed at the screen 201. The display space 200 further includes one or more display space light source 210, which may especially be used to provide lighting effects at the display space 200. Different lighting effects may be generated at different locations of the display space 200. The screen may be a large display, like a large TV, or may be screen on which the images are projected. In this schematically depicted embodiment, the display space 200 further comprises a projector 230, configured to project the images on the screen 201.

Optionally, a receiver 260 may be present, configured to receive one or more of (i) images of the performance (ii) and ambience lighting effect input data from the performance space, especially both type of data. If the display space 200 is a cinema, such sender (transmitter) may send (transmit) the information to for example a cinema server and a lighting system comprising one or more display space light sources 210. However, the receiver may for example also be integrated in a cinema server.

As will be clear to a person skilled in the art, especially the display space light (i.e. the light generated by the display light source) herein comprises light having a wavelength in the visible part of the spectrum. The terms "visible" light or "visible emission" refer to light having a wavelength in the range of about 380 nm to 750 nm. Especially at least 50%, even more especially at least 80%, yet even more especially at least 90% of the light intensity (in Watt) of the display light source is in the visible part of the spectrum.

Herein, the term "media server", which may also be indicated as "cinema server", may be defined as a dedicated computer appliance or to specialized application software, for storing various digital media (meaning digital videos/movies, audio/music, and picture files). The cinema server has a data container with the movie file, and/or it has a satellite connection to receive the movie content. It can often decrypt, decompress and encrypt the movie, before it is sent to the projector. It is often combined with a theatre management system. A cinema server is a server that receives movie data, especially from an external provider; the cinema server may handle content security (like decryption with a key code, watermarking) and may decompress the content, which may then sent to a digital cinema projector using link-encrypted data exchange. Herein, a media server (or e.g. another controller) may be functionally connected to a display device and an (additional) ambience light source.

In this way, the invention allows method for creating in a display space 200 an ambience lighting effect in support of moving images (on the screen 201), wherein the display space 200 comprises said screen 201 configured to display the moving images and a display space light source 210 configured to provide the ambience lighting effect, wherein the moving images are representative of a stage performance performed in a performance space 100, the method comprising (a) deriving ambience lighting effect input data from one or more of (i) a light related cue provided by a cue manager 121 present at the performance space 100 at the time of the stage performance, (ii) lighting effects accompanying the stage performance in the performance space at the time of the stage performance, and (iii) an analysis of a video shot by a video camera 130 configured to monitor at least a part of an audience 105 present in the performance space 100 at the time of the stage performance; and (b) displaying the moving images on the screen 201 in the display space 200, while creating in the display space 200 with the display space light source 210 said ambience lighting effect at least based on the ambience lighting effect input data.

Figure 2:
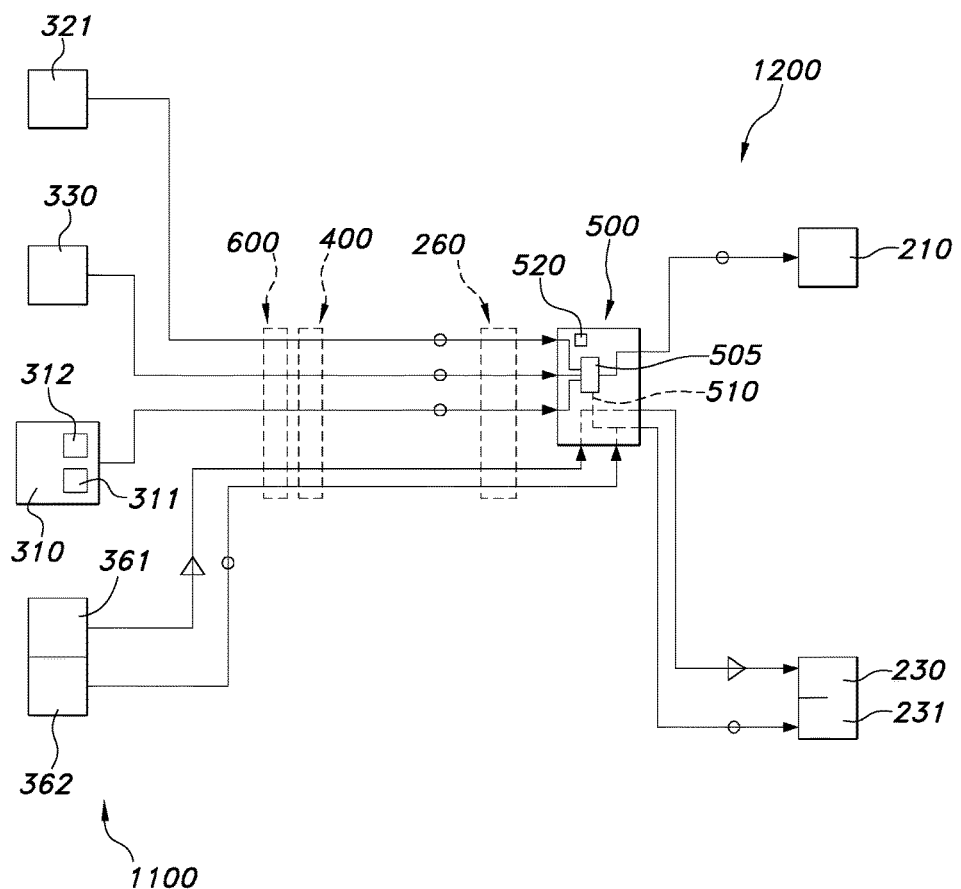
FIG. 2 schematically depicts a further embodiment of the invention.

FIG. 2 schematically depicts an embodiment how information that can be used as ambience lighting effect input data can flow from the performance space to the display space. In FIG. 2 a large number of options is shown. Note however that more or less options may be used.

Reference 321 schematically depicts ambience lighting effect input data from the cue (of a cue manager). Reference 330 indicates ambience lighting effect input data from a video camera. Reference 310 indicates ambience lighting effect input data from performance space light source at the performance space, such as derived from a sensor configured to sense light from such light source or derived from a memory and/or sent by a transmitter (or transmitter). Here reference 311 schematically depicts a memory and reference 312 such transmitter. As indicated above, one or more of these sources of ambience lighting effect input data may be applied).

Further, references 361 and 362 indicate video images (video data) of the stage performance and audio recordings (audio data) of the stage performance, respectively. Information of this type may be recorded on a data carrier, and be used or transmitted later, for instance by a cinema server. Reference 500 indicates a controller, which may especially be at the location of the display space, which may be such cinema server, or which may communicate with a cinema server or which may comprise a cinema server. All or part of the information may be coupled and transmitted in a package, such as by using a signal combiner (time period (or stage)) 400. However, information gathered at the performance time period (or stage) (indicated with reference 1100) may flow in different ways, bundled or non-bundled, and optionally at different times, to a display time period 1200.

Reference 500 also may indicate a plurality of controllers. For example, information 361 (the video to be displayed) may be transmitted to a cinema server 500, and the ambience light effect input data is combined at the location of the stage performance into ambience light effect output (control) data that is sent to a lighting controller, which controls the ambience light sources 210 in the display space.

At the display space, a receiver 260 may be present, which may receive one or more of the audio signal, video signal and ambience lighting effect input. The audio and video signal may directly be transmitted to the projector 230 and a sound system 231, though one or more of these signals may be used as further source of ambience lighting effect input data (indicated with line 510). The concepts as well as various methods of calculating the color from the video signal are described in for instance US-2006/062424 and WO-2006/003624, which are herein incorporated by reference.

The controller 500, as indicated above, may be configured to translate the ambience lighting effect input data into ambience lighting effect output data for the display space light source 210. Note that the display space light source 210 will in general relate to a plurality of light sources, and may especially represent a lighting system for the display space. The controller 500 may further comprise a memory 520. This may for instance be used to store the movie (i.e. moving images, together with the audio that accompanies the moving images). A processor 505 may process the ambience lighting effect input data to the indicated ambience lighting effect output data, based on e.g. predefined relations between ambience lighting effect input data and ambience lighting effect output data (note that processing of the data (in processor 505) may also be done at the location of the stage performance. For example, this processing of the date may take place upstream of reference 260, 400 or 600 (see below). This may have the advantage that the controller at the display space can be less advanced, saving cost for the owners of the display spaces). Reference 600 indicates a data carrier (stage), which may be before or after the optional signal combiner (stage) 400, and which may be used to record one or more of the ambience lighting effect input data (from one or more sources) and/or video data and/or audio data of the stage performance.

Figure 3:
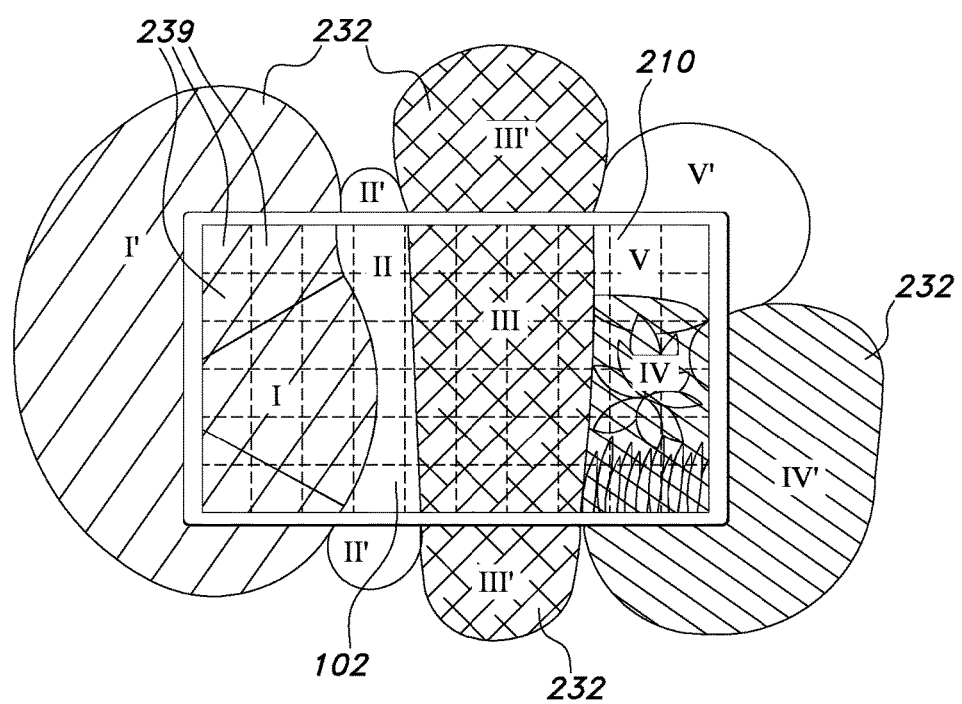
FIG. 3 schematically depicts some aspects of ambience light.

FIG. 3 schematically depicts some aspects of ambience light. The rectangle indicates an image 102 and 232, outside the rectangle, indicates ambience light. The colored regions (indicated by shading) within the image (indicated with roman numbers) and the colored regions outside the image (indicated with roman numerals and an accent mark), i.e. the ambience light, correspond, which is indicated by the areas external from the image having the same type of shading. Of course, the ambience light does not (substantially) depict images, but is a low resolution distribution of colors or even a single color (as is known from TV Ambilight). This is shown by example with the flower in the image, which is a high resolution display of information, whereas external from the image, the ambience light is a single color or a low resolution distribution of colors (in this example only one color for area 232). The ambience light comprises one or more colors determined on one or more average colors of one or more sub-sections, which are indicated by reference 239 of an image. Alternatively, the ambience light comprises one or more colors determined on one or more average colors of one or more sub-sections of a plurality of subsequent images. In this schematic drawing, the image 102 is, by way of example, divided in 10*6 subsections. Subsections adjacent to the edge of the image may especially be of importance to evaluate the color of the ambience light external from the image 102/screen 201. For example, the color in area 232 is an average color and intensity of the bottom-right 30% of the screen, averaged over the last 10 frames. Note that the invention is not limited to ambience lighting in the sense of lighting around a screen in the display space, but may also include lighting that is configured to illuminate the display space (in general) with ambience lighting.

A basic method according to the present invention is a method for providing an ambience lighting effect in a cinema, comprising a cinema screen and a light source, i.e. a display space light source (including especially a plurality of light sources), the method comprising:

receiving cue data (or other relevant data) (i.e. the ambience lighting effect input data) corresponding to the content that is to be displayed on the screen;

determining at least a color or intensity for the ambience lighting effect input data, such as cue data that was received;

determining control data (i.e. the ambience lighting effect output data) based on at least one of the color and intensity that was determined from the ambience lighting effect input data, such as cue data;

controlling the display space light source (including especially a plurality of light sources) based on the control data; wherein the movie content is displayed simultaneously with the plurality of light sources emitting the ambience lighting effect based on the control data.

The advantage of this approach is that the timing of lighting effects cannot always be determined by just the video content, because the video content is not always showing the entire stage. In cue data, however, this will always be visible.

In an embodiment, not only ambience lighting effect input data, such as cue data is used to determined the lighting effects, but a combination is used of cue data, combined with at least one of: video content and sound content. Hence, the method may comprise:

receiving ambience lighting effect input data, such as cue data and at least one of video content and sound content corresponding to the content that is to be displayed on the screen;

determining at least a color or intensity for the ambience lighting effect input data, such as cue data that was received;

determining control data (i.e. the ambience lighting effect output data) based on at least one of the color and intensity that was determined from the ambience lighting effect input data, such as cue data;

controlling the display space light source (including especially a plurality of light sources) based on the control data; wherein the movie content is displayed simultaneously with the plurality of light sources emitting the ambience lighting effect based on the control data.

In one example, cue data is combined with video content. When a "go" cue is given, and no change is detected in the movie content (for example because a close-up of the stage performer is shown), the method looks into the movie content that will be displayed in future, in order to determine the effect the cue might have had. This effect is then shown in the lighting effect at the timing of the "go" cue.

Sometimes the lighting effects during a show are pre-programmed to run automatically when a cue is given. In one embodiment, these programmed lighting effects are also recorded and given as input in the method of the invention. The advantage of this approach this that color and effects are known more accurately, and also certain cues can be ignored based on the type of lighting effect that is related to it.

In a further embodiment cue data is recorded by the light sources that are used in the show. In this embodiment, the light sources are equipped with a recorder for recording the light setting during the stage production. At the end of (or during) the stage production, this data can be collected. In the method according to this further invention, the data that was recorded by the light sources is used as ambience lighting effect input data (or alternative cue data input). In an alternative embodiment the light source does not record the light setting, but instead sends a data signal to a data collection unit, where the light settings and its timing information are stored.

Another embodiment according to the present invention is a stage light comprising a recording means for recording the lighting effect during the stage production. Preferably, this light source records both timing and effects for the light source during the show. The advantage of this approach is that the recording of cue data is independent of the infrastructure of the stage. When the lights according to the invention are used, the data will be recorded automatically.

In an embodiment the cue data comprises "go cues", because these cues indicate the timing of specific lighting effects. Thus the method may comprise:
- receiving "go" cue data corresponding to the content that is to be displayed on the screen;
- determining at least a color or intensity for the ambience lighting effect input data, such as cue data that was received;
- determining control data (i.e. the ambience lighting effect output data) based on at least one of the color and intensity that was determined from the ambience lighting effect input data, such as cue data;
- controlling the display space light source (including especially a plurality of light sources) based on the control data; wherein the movie content is displayed simultaneously with the plurality of light sources emitting the ambience lighting effect based on the control data.

In another embodiment video footage is made of the audience in order to determine the lighting effects that are relevant for audience illumination. This is important information, because in the cinema the cinema audience should preferably be illuminated in a similar way as the audience at the event. Preferably the video footage of the audience uses a camera position that does not move and does not zoom in or out during recording. This has the advantage that it is easier to detect light effects that are illuminating the audience.

In an embodiment the cue data is used to determine the lighting effects in the cinema for live events.

The invention claimed is:

1. A method for creating an ambience lighting effect during a live performance performed in a performance space, to be used in support of moving images in a display space wherein the display space comprises a screen configured to display the moving images and a display space light source configured to provide the ambience lighting effect, wherein the moving images are representative of the live performance, wherein the method comprises the steps of:
- creating ambience lighting effect input data from an analysis of a video shot by a video camera configured to monitor at least a part of an audience present in the performance space at the time of the live performance; and
- displaying the moving images on the screen in the display space, wherein the display space is remote from the performance space, while creating in the display space with the display space light source the ambience lighting effect at least based on the ambience lighting effect input data created using the video of the live performance.

2. The method according to claim 1, wherein the performance space comprises a performance space light source, and wherein the live performance in the performance space is accompanied by lighting effects provided by the performance space light source.

3. The method according to claim 2, wherein the performance space light source further comprises a signal generator configured to translate instructions received into a light source signal containing the ambience lighting effect input data, and wherein a controller, functionally coupled to the display space light source, is configured to control the ambience light of the display space light source as function of the light source signal.

4. The method according to claim 1, wherein the screen comprises one or more of a display screen and a projection screen.

5. The method according to claim 1, wherein the live performance is selected from the group comprising a music concert, a musical, a sport event, a presentation, a seminar, an opera, a religious activity, a cultural activity, a social activity, a commercial activity, and a political activity.

6. The method according to claim 1, wherein the performance space and the display space are each individually selected from the group comprising a cinema, a music hall, a theater, an opera house, a stadium, an arena, a conference room, a home, a hospitality area, a church, an exhibition ground, and an open square.

7. The method according to claim 1, wherein the method includes live streaming the live performance to the display space while generating with the display space light source ambience lighting effects based on the ambience lighting effect input data.

8. The method according to claim 7, wherein the method includes displaying the live performance in the display space while generating with the display space light source ambience lighting effects based on (i) the ambience lighting effect input data and (ii) the content of the information displayed on the screen in the display space.

9. The method according to claim 1, further comprising recording on a data carrier a scene of the live performance shown in the performance space or displayed on the screen in the display space.

10. The method according to claim 9, further comprising recording on a data carrier the ambience lighting effect input data.

11. The method according to claim 9, further comprising recording on a data carrier (i) a scene of the live performance shown in the performance space or displayed on the screen in the display space, as well as (ii) the ambience lighting effect input data derived during said scene.

12. The method according to claim 1, wherein the step of creating ambience lighting effect input data further includes a light related cue provided by a human cue manager present at the performance space at the time of the performance.

13. The method according to claim 12, wherein the ambience lighting effect input data are derived from one or more of a spoken word and an electrical signal given or induced by the live human cue manager.

14. The method according to claim 13, wherein part of the ambience lighting effect input data is also derived from a library containing lighting effect information and timing information, wherein the lighting effect information in the library contains one or more series of lighting effects.

* * * * *